INVENTOR.
Christie Petrides
BY
Leonard J. Platt
ATTORNEY

INVENTOR.
Christie Petrides
BY
Leonard V. Platt
ATTORNEY

United States Patent Office 3,497,782
Patented Feb. 24, 1970

3,497,782

BATTERY OPERATED CLOCK CIRCUIT

Christie Petrides, Medway, Mass., assignor to General Electric Company, a corporation of New York Filed May 4, 1967, Ser. No. 636,035
Int. Cl. H02p 7/28
U.S. Cl. 318—138 9 Claims

ABSTRACT OF THE DISCLOSURE

A battery operated clock circuit of the type employing an electromechanical oscillator and a pulse type clock motor. Two NPN silicon transistors are employed. One serves as an oscillator transistor and operates near saturation with the pickup coil of the mechanical oscillator in its base circuit. Its output supplies the drive coil of the mechanical oscillator and also triggers the second transistor, which operates in the siwtching mode, to supply pulses of battery current to the clock motor.

BACKGROUND OF THE INVENTION

This invention pertains to a battery operated clock circuit of the type wherein an electromechanical oscillator produces a train of accurately timed pulses for driving a pulse type clock motor.

In my copending patent applications Ser. No. 522,129, filed Jan. 21, 1966 (now Patent No. 3,432,735) and Ser. No. 522,199, filed Jan. 21, 1966 with Harry Albinger, Jr., and the copending application of Clifford N. Jones, Ser. No. 522,290, filed Jan. 21, 1966, (now Patent No. 3,454,856), all assigned to the same assignee as the present invention, there are disclosed various modifications of battery operated clocks. The circuit of each of these clocks employs a mechanical oscillator comprising one or two disc shaped permanent magnets mounted on a torsion wire and placed in proximity to a drive coil and a pickup coil. In the more recentmodifications, the drive and pickup coils are wound about a common core and a single magnet is employed. This magnet is mounted on a flat torsion spring so as to oscillate under the influence of the drive coil. An NPN silicon oscillator transistor receives the signal induced in the pickup coil, amplifies the signals and returns them to the drive coil so as to form an electromechanical oscillator. The same signals are applied to the base of a PNP germanium amplifier transistor which applies the amplified current pulses to the stator windings of a synchronous pulse motor. The circuits are so arranged that the oscillator and amplifier transistors are in their "on" or "off" states at the same time.

Although these prior art circuits are a distinct advance in the art, there are certain deficiencies it would be desirable to overcome. For example, it would be advantageous to reduce the amount of coupling between the two stages. In the prior art circuitry the drive coil is across the base-emitter terminals of the amplifier transistor so that some undesirable feedback occurs. Furthermore, it would be economically desirable to employ two similar transistors, preferably of the silicon type, as they are much less temperature sensitive and are also less expensive than the germanium type. Even though silicon transistors are less temperature sensitive than germanium transistors, it would also be desirable to introduce into the circuit some type of temperature compensation so as to even further decrease the temperature sensitivity of the circuit. Also, in the prior art circuitry, the impedance of the drive coil circuit varies with temperature, thus causing an undesirable variation in the amplitude of the mechanical oscillation.

SUMMARY OF THE INVENTION

In the circuit of the present invention there are provided two similar NPN silicon transistors. One of these is the oscillator transistor, which is self biased so that it operates very near its saturation point. The cyclical pulses produced by the pickup coil periodically drive this transistor into and out of saturation. The amplified output from the oscillator transistor supplies the drive coil of the electromechanical oscillator and also provides D.C. bias to the base of the amplifier transistor. The amplifier transistor is operated in a switching mode and its collector-emitter terminals are in series with the field coils of the clock motor.

DESCRIPTION OF THE PREFERRED EMBODIMENT

Figure 1:
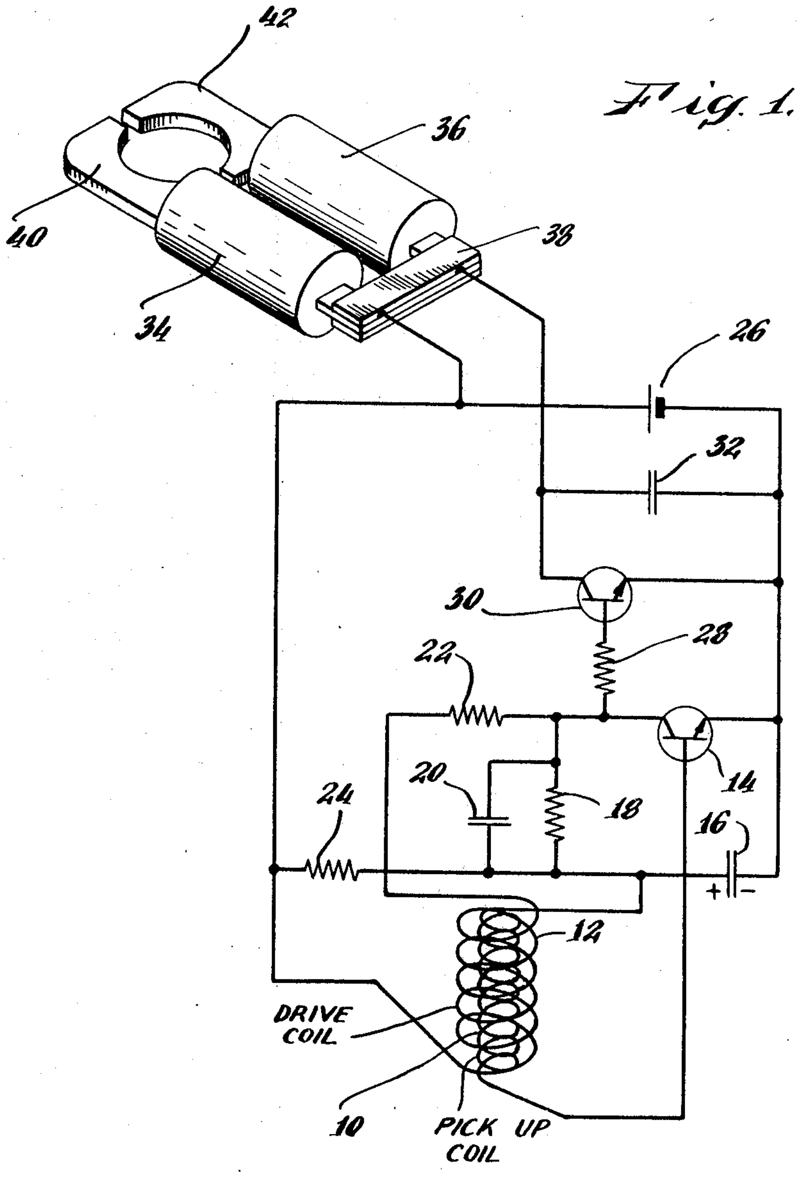
FIG. 1 is a partially schematic, partially pictorial representation of the circuit of this invention.

Turning now to FIG. 1, there is illustrated a circuit including the pickup coil 10 and the drive coil 12 of an electromechanical oscillator. As illustrated, these coils are wound on the same core. The pickup coil 10 is connected in the base circuit of the oscillator transistor 14, which is an NPN silicon transistor. A fifty microfarad capacitor 16 is connected between the emitter electrode of transistor 14 and the other end of the pickup coil 10. A 10,000 ohm resistor 18 and a .1 microfarad capacitor 20 are connected in parallel with one another between the collector electrode of transistor 14 and the other end of the pickup coil 10. A 4,700 ohm resistor 22 is connected between the collector electrode of transistor 14 and one end of drive coil 12. The other end of drive coil 12 is connected to a 47,000 ohm resistor 24 and to the positive terminal of a battery 26. The other end of the resistor 24 is connected to the common junction of capacitor 16, pickup coil 10, resistor 18 and capacitor 20. The collector electrode of transistor 14 is also connected through a 10,000 ohm resistor 28 to the base of a switching transistor 30, which is also an NPN silicon transistor similar to transistor 14. In the illustrated embodiment, both these transistors are General Electric 2N2926.

The emitter of transistor 30 is connected to the emitter of transistor 14 and to the negative side of a 1.5 volt battery 26. A two microfarad capacitor 32 is connected across the collector-emitter terminals of transistor 30 and the field coils 34, 36 of the clock motor are connected in series between the collector electrode of transistor 30 and the positive terminal of battery 26. The field coils are mounted upon a U-shaped laminated stator member 38 terminating a pair of U-shaped sections 40, 42 which encircle a permanent magnet rotor 44 (FIG. 2).

Figure 2:
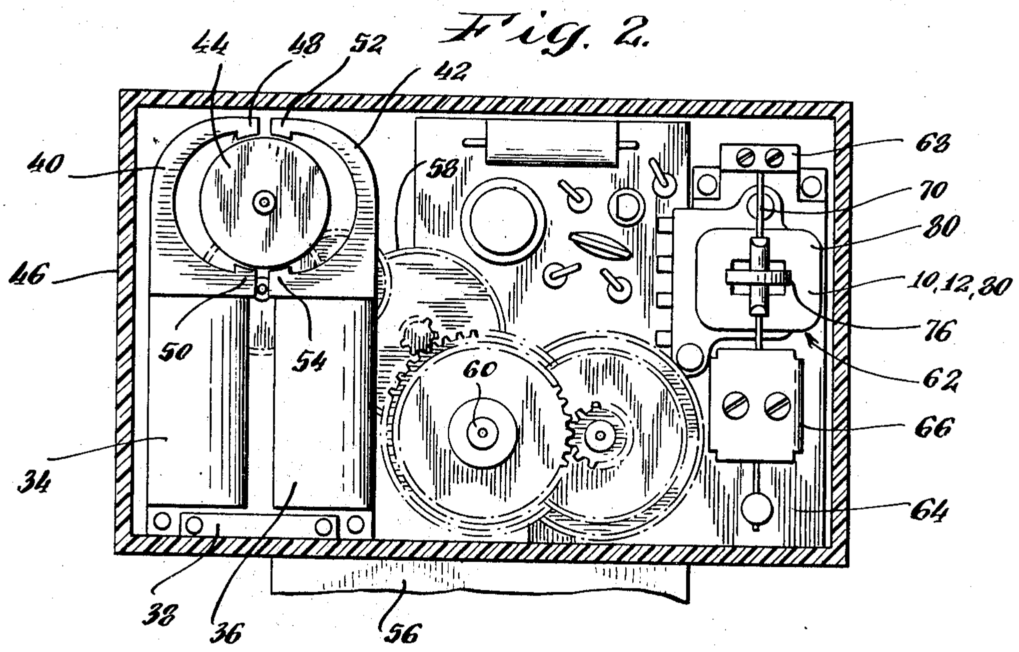
FIG. 2 is a sectional view of a battery operated clock showing the components thereof.

FIG. 2 illustrates the manner in which the various components of the invention may be positioned within the clock casing. In FIG. 2 the clock casing 46 includes the pulse type permanent magnet synchronous motor comprising the field coils 34, 36 mounted upon the stator member 38 having the U-shaped sections 40, 42. The ends of the U-shaped sections form pole pieces 48, 50, 52, 54 adjacent the rotor 44. A housing 56 contains the battery 26 of FIG. 1. The rotor 44 is coupled in driving engagement with a gear train 58 for driving a pair of clock hands (not shown) by means of a concentric shaft mechanism 60.

Figure 3:
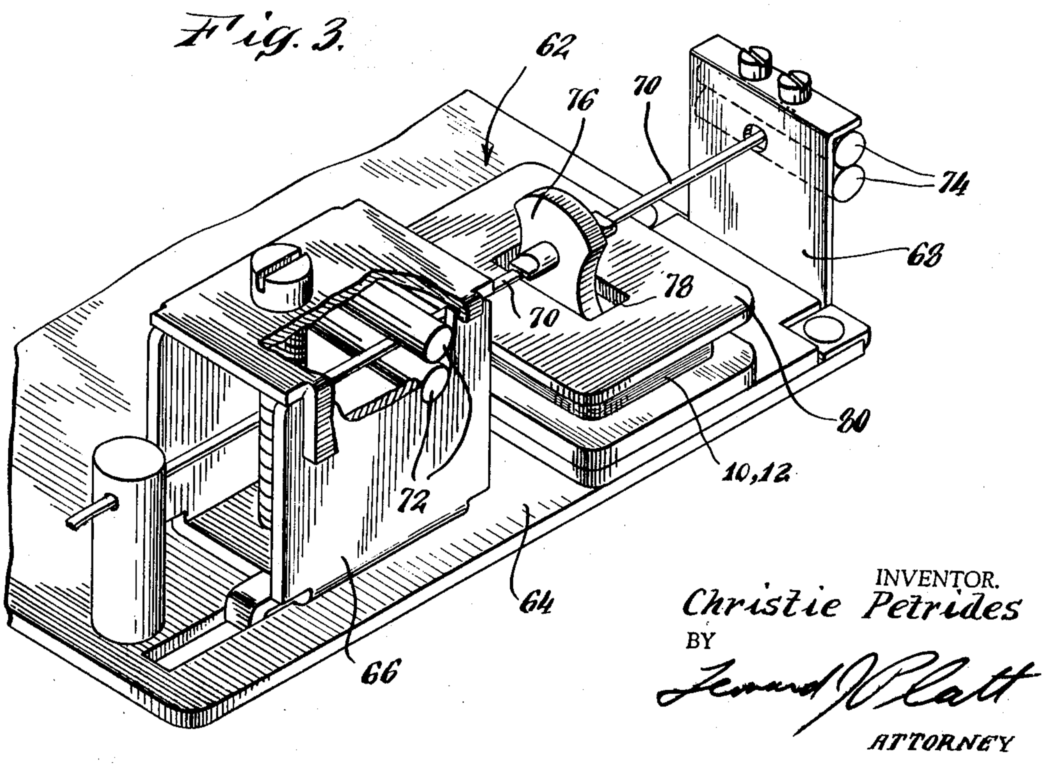
FIG. 3 is a perspective view of the mechanical oscillator used in the present invention.

Mounted in the right hand end of the casing 46 is the mechanical portion 62 of the electromechanical oscillator, which is illustrated in more detail in FIG. 3. The mechanical oscillator 62 is mounted on one end of the clock base plate 64. It comprises a pair of support members 66, 68 which support therebetween a flat spring wire torsion member 70 between spaced pairs of clamping bars 72, 74. Mounted upon the torsion member is a partially disc shaped permanent magnet 76 positioned to extend into a rectangular opening 78 in a coil form 80 upon which are found the pickup coil 10 and drive coil 12. The torsion member 70 oscillates at a natural frequency, depending upon its length between the clamping bars 72, 74 and its tension. Oscillation of the torsion member 70 causes the permanent magnet 76 to also oscillate, thereby setting up an alternating magnetic field in pickup coil 10.

Referring back to FIG. 1, resistor 18 self-biases transistor 14 so that its operating point is near saturation. As magnet 76 oscillates within the pickup coil 10; it induces an alternating current in the pickup coil which, when applied to the base of transistor 14, drives the transistor alternately into and away from saturation. During the period of saturation, the voltage at the collector is low, the transistor 14 being in its "on" condition. During this same period, of course, maximum current will be passing through the drive coil 12 for rotating the magnet 76. As the low voltage on the collector of transistor 14 is applied through resistor 28 to the base of transistor 30, this transistor, which is operated in the switching mode, is in its high impedance state. Thus the collector-emitter current passing through this transistor is at a minimum so that the field coils 34, 36 of the motor are basically deenergized.

Assume now that magnet 76 reaches the limit of its oscillation and begins to return. It now induces a current of opposite polarity in pickup coil 10 which, being applied to the base of transistor 14, drives it away from saturation. Transistor 14 then changes from its low impedance state to its high impedance state, reducing the flow of current through drive coil 12. Simultaneously, its collector voltage increases and this increased voltage, applied to the base of transistor 30, switches transistor 30 into its low impedance state. This permits a pulse of battery current to flow through the field coils 34, 36 energizing the motor. This cyclic "on" and "off" action of transistor 30 is established by the frequency of the mechanical oscillator, which thereby serves as the basic regulator of the system.

The capacitor 16 provides a low impedance current path for the signals induced in pickup coil 10 and, at the same time, blocks D.C. current flow from battery 26 to the drive coil 12. Capacitor 20 provides a low impedance path for high frequency oscillations that may occur due to coupling between coils 10 and 12 to prevent transistor 14 from going into high frequency oscillations.

In addition to the economies achieved over prior art circuits by means of using two similar transistors, several other advantages are also obtained. First, as the drive coil 12 is no longer across the base-emitter terminals of transistor 30, there is a substantial improvement in decoupling with substantially no feedback from drive coil 12. Second, as silicon transistors are much less temperature sensitive than germanium transistors, there is less variation in the impedance of the drive coil supply circuit with temperature changes. Thus, the amplitude of the oscillations remains substantially constant, even over relatively large temperature ranges, resulting in reduced error. A third very important feature of this invention is its ability to automatically compensate for temperature changes. Referring, for example, to FIG. 1, if the temperature should increase, the collector-emitter current of transistor 14 would also tend to increase. However, this would reduce the collector terminal voltage of transistor 14 and this reduction in voltage, applied to the base of transistor 30, would tend to reduce the collector-emitter current through transistor 30, a tendency which would be in direct opposition to the temperature effect upon the transistor. Thus, a considerable amount of automatic temperature compensation is achieved.

One further feature of the circuit of this invention should be noted. This is it "self starting" ability. As soon as battery 26 is inserted, or the circuit is closed by other means, it will be noted that oscillator transistor 14 will be self biased near saturation. Thus, its output impedance is low and the switching transistor 30 is "on," energizing the motor coils. As the oscillations build up, signals from the pickup coil drive the operating point of transistor 14 away from saturation and into its high impedance state for about a half cycle and back into saturation for the rest of the cycle. The effect of these oscillations is to drive transistor 30 into a high impedance state from its originally low impedance state which then turns the motor coils "off" in preparation for the next pulse.

While the foregoing description has included specific values for the circuit elements, it will be understood that these are by way of illustration only and that many modifications may be made in this circuit without departing from the spirit and scope of the invention. The foregoing description is illustrative only rather than limiting. This invention is limited only by the scope of the following claims.

What I claim as new and desire to secure by Letters Patent of the United States is:

1. An electromechanical oscillator circuit for timing driving pulses to a pulse-type synchronous motor comprising:

(a) a voltage source;

(b) a mechanical oscillator;

(c) electromagnetic drive means for actuating said mechanical oscillator;

(d) electromagnetic pickup means responsive to oscillations of said mechanical oscillator to produce an alternating current signal;

(e) first current control transistor means biased near saturation and having a normally low impedance state and a high impedance state in series with said drive means and said voltage source, said first current control transistor means being responsive to said alternating current signal to transfer to said high impedance state when said alternating current signal is of a preselected polarity, the conductivity of said first current control transistor means being necessary for operation of said synchronous motor;

(f) second current control means having a low impedance state and a high impedance state in series with said synchronous motor and said voltage source, said second current control means being responsive to current flow through said first current control transistor means and having its impedance states reversed relative thereto.

2. The circuit of claim 1 wherein said electromagnetic pickup means is in the base circuit of said transistor means.

3. The circuit of claim 1 wherein said second current control means is a transistor operating in its switching mode.

4. The circuit of claim 1 wherein each of said first and second current control means is an NPN transistor.

5. The circuit of claim 4 wherein said first current control transistor means includes said pickup means in its base circuit and wherein said second current control transistor is operated in the switching mode and has its base terminal connected to the collector terminal of said first transistor.

6. The circuit of claim 1 wherein said mechanical oscillator is a torsion wire having a permanent magnet mounted thereon.

7. The circuit of claim 6 wherein said electromagnetic drive means and said electromagnetic pickup means each comprises an electrical coil in flux-linking relationship with said permanent magnet.

8. The circuit of claim 7 wherein said first current control transistor means has said pickup coil in its base circuit and wherein said second current control means is a second transistor operated in the switching mode and having its base terminal connected to the collector terminal of said first transistor.

9. The circuit of claim 8 wherein each of said first and second transistors is an NPN transistor.

References Cited

UNITED STATES PATENTS 2,829,324 4/1958 Sargeant -------- 318—130 XR

G. R. SIMMONS, Primary Examiner

U.S. Cl. X.R.

318—132, 254

PO-1050
(5/69)

UNITED STATES PATENT OFFICE
CERTIFICATE OF CORRECTION

Patent No. 3,497,782 Dated February 24, 1970

Inventor(s) Christie Petrides

It is certified that error appears in the above-identified patent and that said Letters Patent are hereby corrected as shown below:

Column 6, References Cited should include:

| | | | | |
|---|---|---|---|---|
| 2,895,095 | 7/1959 | Guyton | 318-254 | XR |
| 3,046,460 | 7/1962 | Zemla | 318-132 | |
| 3,100,278 | 8/1963 | Reich | 318-132 | XR |
| 3,134,220 | 5/1964 | Meisner | 318-138 | XR |
| 3,168,690 | 2/1965 | Lavet et al | 318-138 | XR |
| 3,214,662 | 10/1965 | deWolf | 318-138 | XR |
| 3,360,703 | 12/1967 | Reich | 318-132 | XR |
| 3,375,423 | 3/1968 | Mayer et al | 318-138 | |
| 3,403,312 | 9/1968 | Sparing | 318-132 | XR |

SIGNED AND
SEALED
AUG 18 1970

(SEAL)
Attest:

Edward M. Fletcher, Jr.
Attesting Officer

WILLIAM E. SCHUYLER, JR.
Commissioner of Patents